(12) United States Patent
Wu

(10) Patent No.: US 7,926,429 B2
(45) Date of Patent: Apr. 19, 2011

(54) ANGLE-ADJUSTABLE HEAT-DISSIPATING PAD FOR PORTABLE COMPUTER

(75) Inventor: Chia-Jung Wu, Chung-Ho (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 319 days.

(21) Appl. No.: 12/202,700

(22) Filed: Sep. 2, 2008

(65) Prior Publication Data

US 2010/0050907 A1      Mar. 4, 2010

(51) Int. Cl.
*A47B 23/00* (2006.01)
(52) U.S. Cl. ........... 108/43; 248/918; 248/456; 248/118
(58) Field of Classification Search ............ 108/43, 108/1, 9, 50.01, 50.02, 44; 248/454, 455, 248/456, 462, 463, 918, 118, 118.1, 118.3
See application file for complete search history.

(56) References Cited

U.S. PATENT DOCUMENTS

| | | | | | |
|---|---|---|---|---|---|
| 1,959,746 | A | * | 5/1934 | Stout | 248/455 |
| 3,095,666 | A | * | 7/1963 | Killen | 248/449 |
| 5,082,230 | A | * | 1/1992 | Chang | 248/476 |
| 5,183,230 | A | * | 2/1993 | Walker et al. | 248/118 |
| 5,467,952 | A | * | 11/1995 | Martin | 248/118.1 |
| 5,547,154 | A | * | 8/1996 | Kirchhoff et al. | 248/118.3 |
| 5,651,525 | A | * | 7/1997 | Yang | 248/456 |
| 5,746,410 | A | * | 5/1998 | Hung | 248/441.1 |
| 5,933,996 | A | * | 8/1999 | Chang | 40/748 |
| 6,138,966 | A | * | 10/2000 | Smith | 248/176.1 |
| 6,216,988 | B1 | * | 4/2001 | Hsu et al. | 248/118 |
| 6,378,831 | B1 | * | 4/2002 | Copeland, Jr. | 248/345.1 |
| 6,682,038 | B2 | * | 1/2004 | Golynsky | 248/346.01 |
| 7,140,304 | B1 | * | 11/2006 | Lawrie | 108/25 |
| 7,172,167 | B2 | * | 2/2007 | Phifer et al. | 248/460 |
| 7,182,993 | B1 | * | 2/2007 | Hamilton | 428/100 |
| 7,487,940 | B2 | * | 2/2009 | Saez et al. | 248/176.1 |
| 2002/0148933 | A1 | * | 10/2002 | Lin | 248/118 |
| 2003/0231460 | A1 | * | 12/2003 | Moscovitch | 361/681 |
| 2004/0007649 | A1 | * | 1/2004 | Vettraino | 248/127 |
| 2008/0149801 | A1 | * | 6/2008 | Wood | 248/450 |

* cited by examiner

*Primary Examiner* — José V Chen
(74) *Attorney, Agent, or Firm* — Chun-Ming Shih; HDLS IPR Services

(57) ABSTRACT

An angle-adjustable heat-dissipating pad for a portable computer conforms to the ergonomics and includes: a plate provided with a guiding slot and fixing troughs, both sides of the guiding slot being provided with a plurality of positioning regions; a support provided with a positioning post, the positioning post passing through the guiding slot with the support being detachably assembled in the guiding slot of the plate to support the plate; and a supporting pad passing through the fixing trough and connected to the bottom of the plate, thereby preventing the articles on the plate form sliding. With the positioning post of the support being positioned in the positioning region in a multi-stage manner, the plate on the support can be positioned at a plurality of angles. Furthermore, the supporting pad can support the elbow of a user and conform to the ergonomics.

13 Claims, 8 Drawing Sheets

ANGLE-ADJUSTABLE HEAT-DISSIPATING PAD FOR PORTABLE COMPUTER

BACKGROUND OF THE INVENTION

1. Field of the Invention

The present invention relates to a heat-dissipating pad, and in particular to a heat-dissipating pad that can be used in a portable computer.

2. Description of Prior Art

The heat-dissipating pad generally used in a portable computer is formed into a flat plate. Via this arrangement, when the heat-dissipating pad is disposed flatly on the surface of a table, the space under an air inlet of the portable computer can be increased, thereby reducing the obstacle to the convention of air. Further, such an arrangement can increase the amount of air introduced in the air inlet, thereby facilitating the dissipation of the heat generated by the portable computer.

In most cases, the user always uses the heat-dissipating pad on a fixed surface of a desk, so that the viewing angle of the user is also fixed. When the portable computer is disposed on the surface of the desk, the angle of a screen of the portable computer with respect to the surface of the desk should be adjusted, thereby achieving the desired viewing angle for the user. If the inclination angle of the heat-dissipating pad can be adjusted to provide an optimal viewing angle for the user, it would be very convenient. However, most of the conventional heat-dissipating pads cannot allow a user to adjust its inclination angle. Although there are a few heat-dissipating pads in which a complicated means is provided to generate an angle-adjusting effect, the cost of these complicated heat-dissipating pads is so large. Further, when the user uses the heat-dissipating pad of the portable computer, the elbow of the user is always suspended in midair without any support. Thus, such a heat-dissipating pad does not conform to the ergonomics. After using for a long time, the elbow of the user may get hurt.

Therefore, it is an important issue for the present Inventor to overcome the above problems.

SUMMARY OF THE INVENTION

The present invention is to provide an angle-adjustable heat-dissipating pad for a portable computer, which includes a plate provided with a guiding slot penetrating the plate, the plate on both sides of the guiding slot being provided with at least one positioning groove; and a support provided with a positioning post, the positioning post passing though the guiding slot of the plate and being positioned in the positioning groove of the plate, the support being detachably assembled in the guiding slot of the plate to support the plate.

The present invention is to provide an angle-adjustable heat-dissipating pad for a portable computer, which includes a plate provided with a guiding slot penetrating the plate, the plate on both sides of the guiding slot being provided with at least one positioning groove, the bottom of the plate being provided with at least one fixing trough; a support provided with a positioning post, the positioning post penetrating the guiding slot of the plate and being positioned in the positioning groove of the plate, the support being detachably assembled in the guiding slot of the plate to support the plate; and a supporting pad penetrating the fixing trough to be connected to the bottom of the plate.

The present invention is to provide an angle-adjustable heat-dissipating pad for a portable computer, which includes a plate provided with a guiding slot penetrating the plate, the plate on both sides of the guiding slot being provided with at least one positioning region, the bottom of the plate being provided with at least one fixing trough; a support provided with a positioning post, the positioning post penetrating the guiding slot of the plate and being positioned in the positioning region of the plate, the support being detachably assembled in the guiding slot of the plate to support the plate; and a supporting pad penetrating the fixing trough to be connected to the bottom of the plate.

DETAILED DESCRIPTION OF THE INVENTION

The detailed description and technical contents of the present invention will be explained with reference to the accompanying drawings. However, the drawings are illustrative only but not used to limit the present invention.

Figure 1:
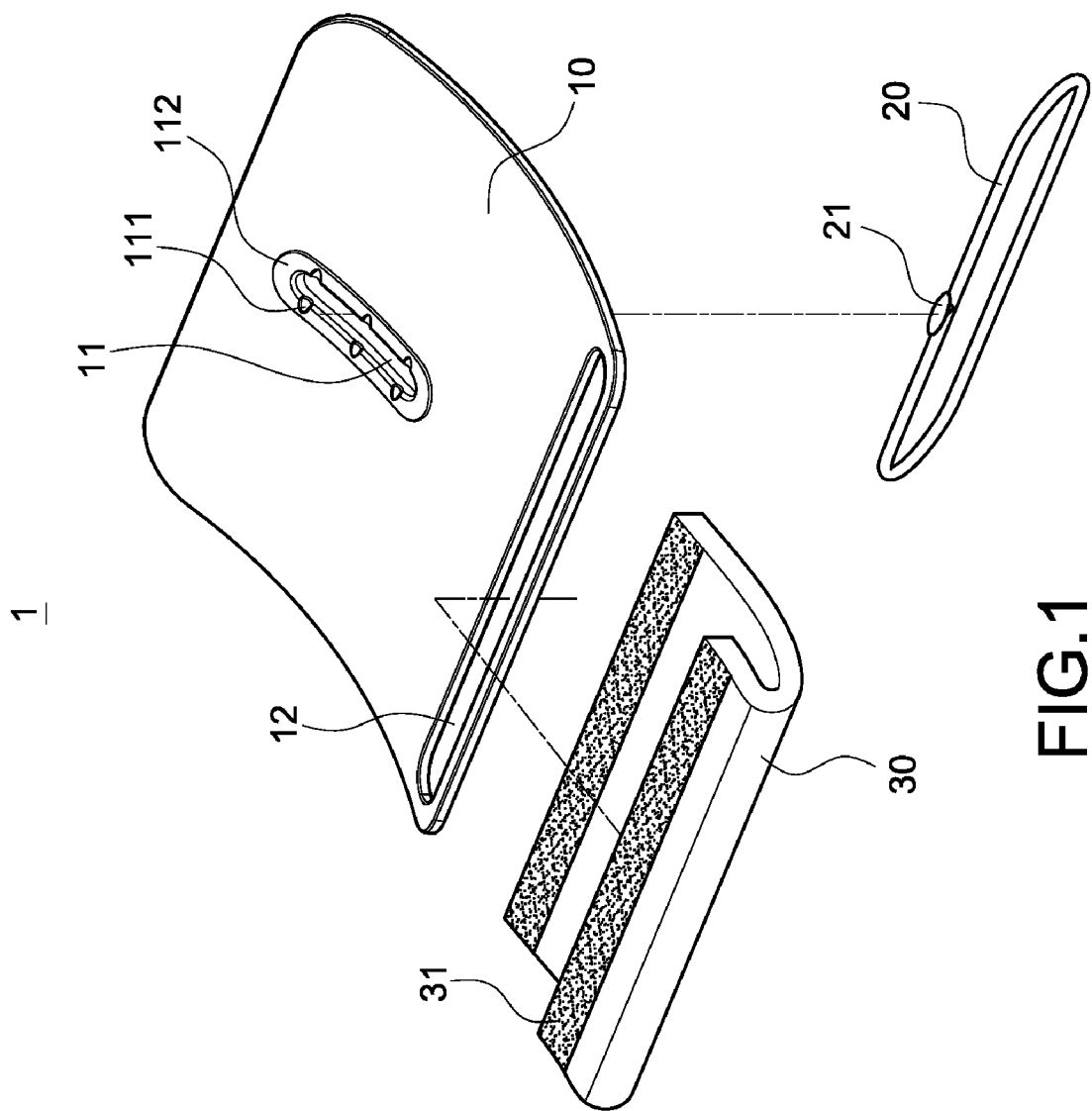
FIG. 1 is an assembled perspective view of the present invention.
Figure 2:
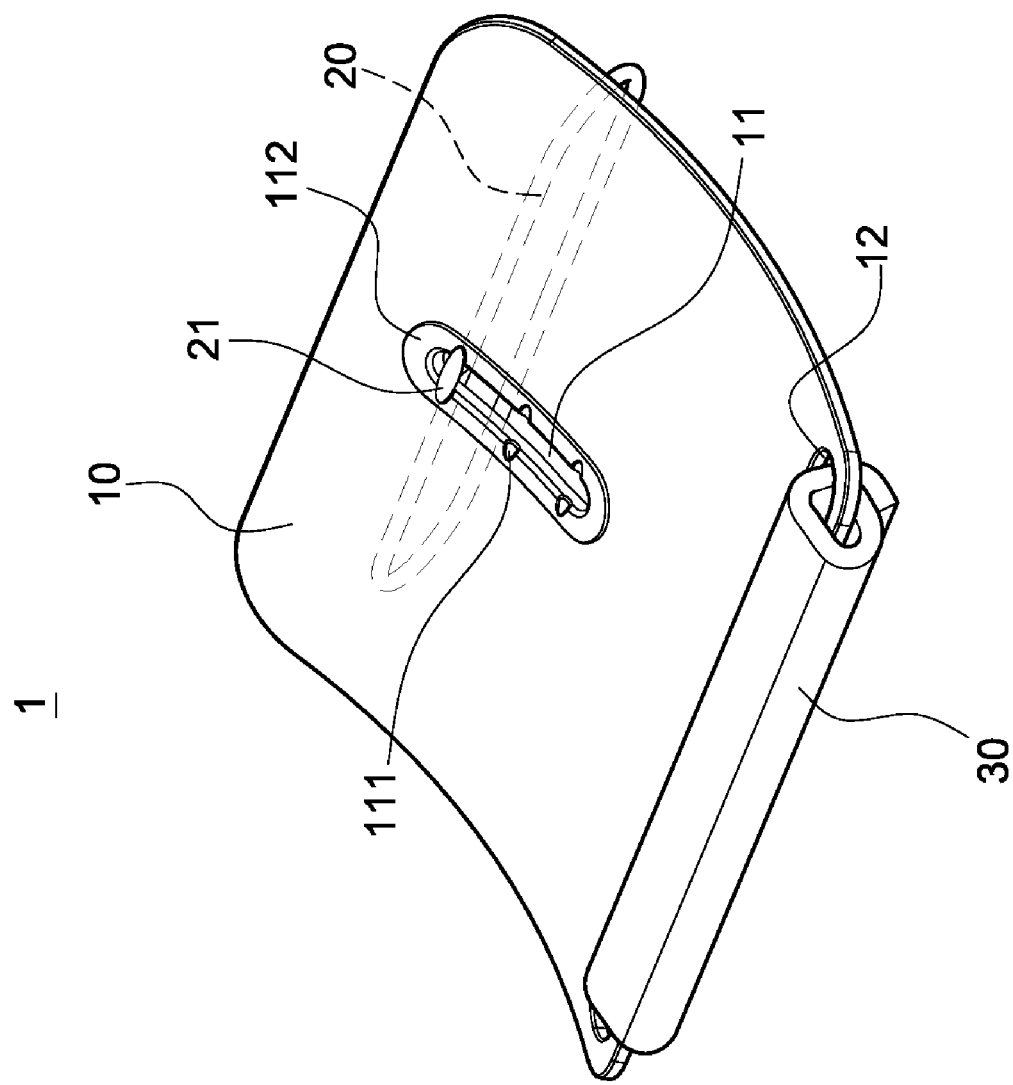
FIG. 2 is a perspective view showing the external appearance of the present invention.

Please refer to FIGS. 1 and 2. FIG. 1 is an assembled perspective view of the present invention, and FIG. 2 is a perspective view showing the external appearance of the present invention. The present invention provides an angle-adjustable heat-dissipating pad 1 for a portable computer, which includes a plate 10. The plate 10 is provided with a guiding slot 11 penetrating the plate 10. The plate 10 on both sides of the guiding slot 11 is provided with at least one positioning groove 111. A support 20 is detachably provided below the plate 10. The support 20 is provided with a positioning post 21. The positioning post 21 passes through the guiding slot 11 of the plate 10 and is positioned on the positioning groove 111, so that the support 20 can be detachably assembled in the guiding slot 11 of the plate 10 to support the plate 10.

In the present embodiment, the support 20 is a metallic frame. The bottom of the plate 10 is provided with at least one fixing trough 12. In the present embodiment, a fixing trough 12 is provided for penetrating the plate 10. The fixing trough 12 is provided with a supporting pad 30 made of a soft cloth. Both ends of the supporting pad 30 are provided with a fastener 31 such as Velcro. After the supporting pad 30 is wound around the fixing trough 12, the fasteners 31 can be used to connect to the bottom of the plate 10. The plate 10 is made of wood, thereby forming a heat-dissipating pad 1 having a good touch. The cross section of the plate 10 is formed into an arc shape. The plate 10 is provided with a plurality of positioning grooves 111. The positioning grooves 111 are symmetrically provided on the plate 10 on both sides of the guiding slot 11 at intervals. In the present embodiment, the plate 10 on both sides of the guiding slot 11 is symmetrically provided with three positioning grooves 111 respectively. The positioning groove 111 is formed into a concave surface for abutting a positioning post 21 of the support 20. In addition, the periphery of the guiding slot 11 is provided with a hollow frame 112. The positioning grooves 111 are provided on the hollow frame 112.

Figure 3:
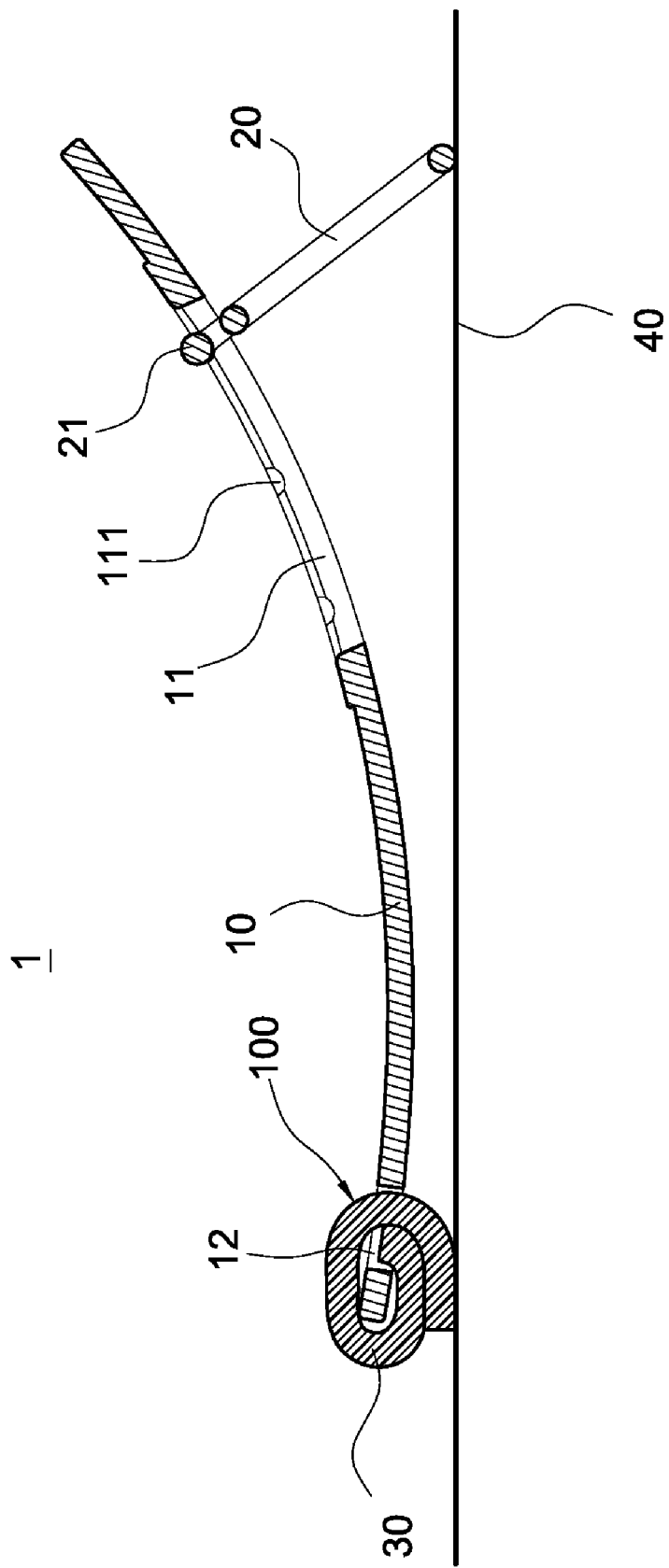
FIG. 3 is an assembled cross-sectional view of the present invention.
Figure 4:
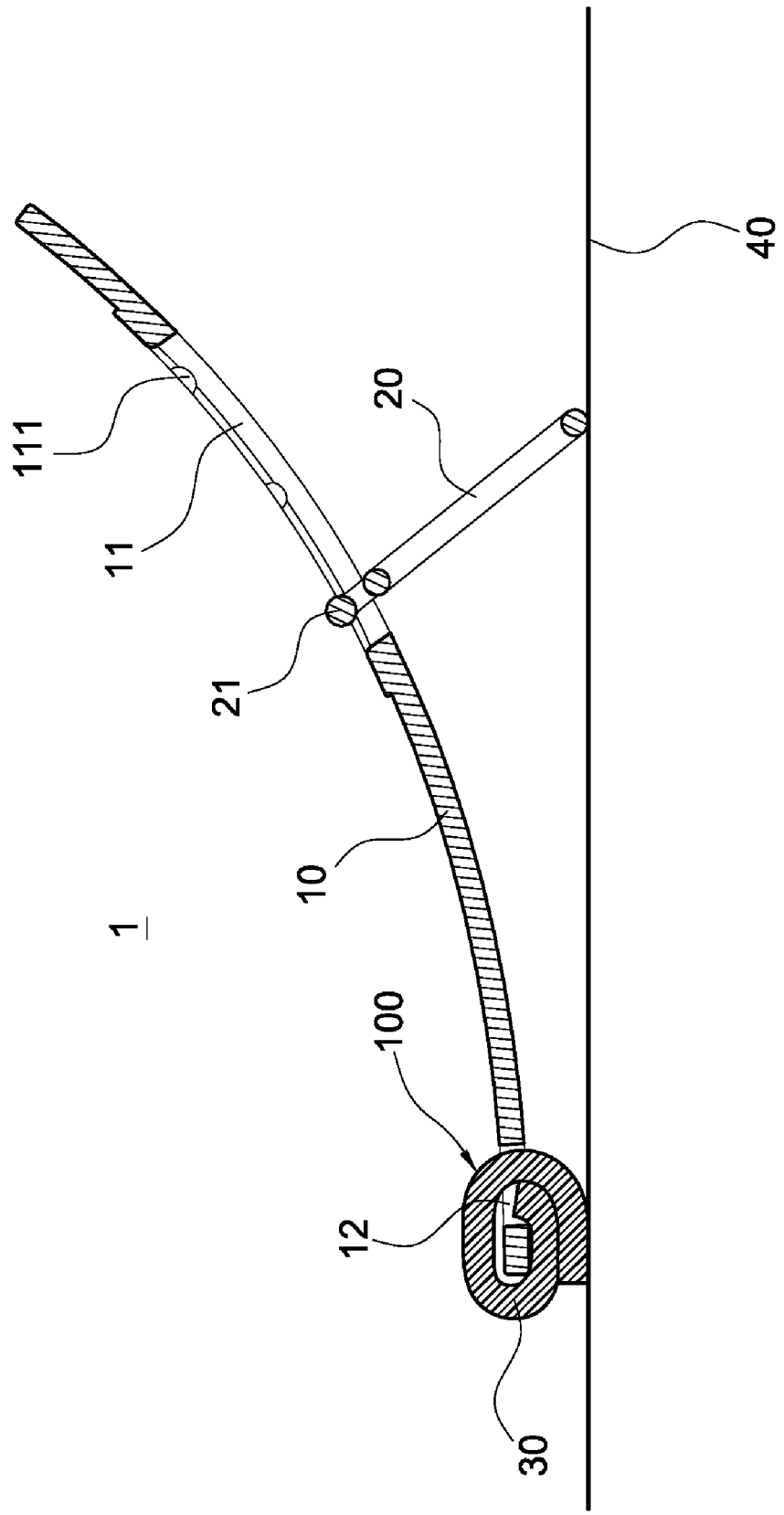
FIG. 4 is an assembled cross-sectional view showing another state of the present invention.

Please refer to FIGS. 3 and 4, which are two assembled cross-sectional views of the present invention showing the support 20 and the supporting pad 30 being assembled in the plate 10. The positioning post 21 of the support 20 passes through the guiding slot 11 to abut the positioning groove 111 of the plate 10, so that the support 20 can obliquely support the plate 10 in a plane 40. The supporting pad 30 generates a skid-proof and stopping effect. The fixing trough 12 on the bottom of the plate 10 is formed with a stopping portion 100, thereby preventing the articles disposed on the plate 10 from sliding. In FIG. 3, the positioning post 21 of the support 20 is stopped in the positioning groove 111 adjacent to the top of the plate 10, so that the inclination angle of the plate 10 is small and close to the plane 40. In FIG. 4, the positioning post 21 of the support 20 is stopped in the positioning groove 111 adjacent to the bottom of the guiding slot 11, so that the inclination angle of the plate 10 is large and away from the plane 40. With the positioning post 21 of the support 20 being positioned in the positioning groove 111 in a multi-stage manner, the plate 10 of the support 20 can be positioned at a plurality of angles.

Figure 5:
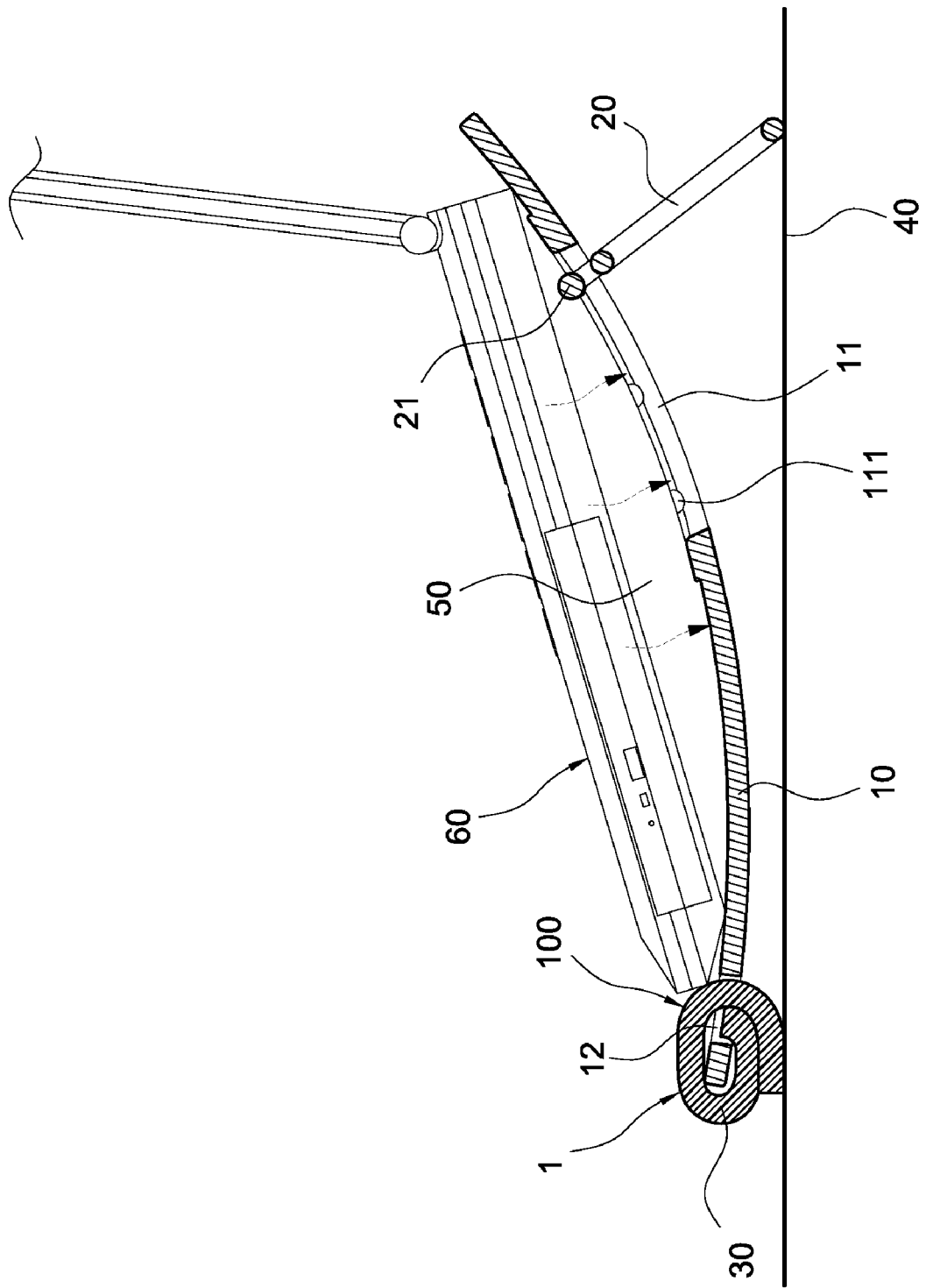
FIG. 5 is a schematic view showing an operating state of the present invention.

Please refer to FIG. 5, which is a schematic view showing an operating state of the angle-adjustable heat-dissipating pad for a portable computer according to the present invention. The support 20 is detachably assembled in the guiding slot 11 of the plate 10 to support the plate 10. The supporting pad 30 passes through the fixing trough 12 and is connected with the bottom of the plate 10, thereby forming a stopping portion 100. The positioning post 21 of the support 20 can be positioned in the positioning groove 111 of the plate 10 in a multi-stage manner, so that the user can adjust the inclination angle of the plate 10 to achieve a desired viewing angle. The supporting pad 30 can prevent the portable computer 60 from sliding on the plate 10. Since the supporting pad 30 is made of a soft and elastic cloth, it conforms to the ergonomics and thus the user will feel comfortable when his/her elbow is put on the supporting pad 30.

In use, the angle-adjustable heat-dissipating pad 1 for a portable computer is disposed on a plane 40. A portable computer 60 is disposed on the plate 10. Since an intake space 50 is formed between the portable computer 60 and the surface of the plate 10, the amount of air flowing through the intake space 50 below the portable computer 60 can be increased, so that the heat generated by the portable computer 60 can be dissipated quickly. In the present embodiment, since the cross section of the plate 10 is curved, the capacity of the intake space 50 can be enlarged.

Figure 6:
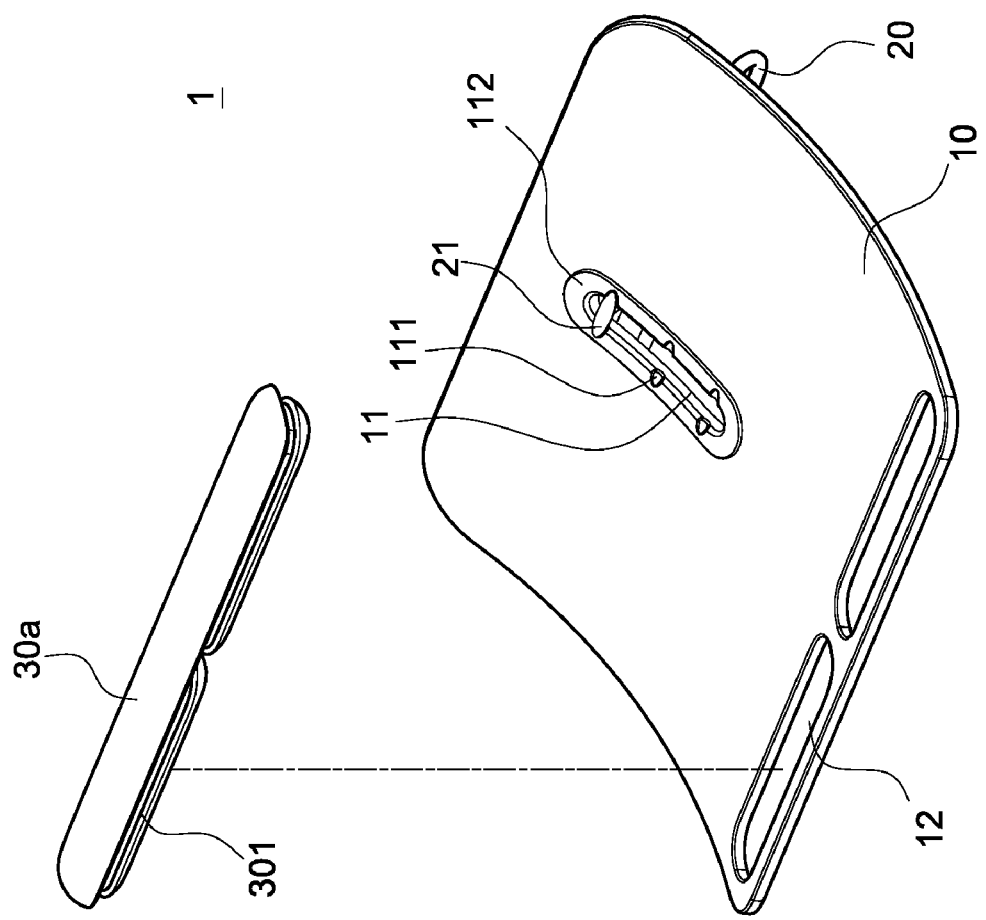
FIG. 6 is an assembled perspective view showing the second embodiment of the present invention.
Figure 7:
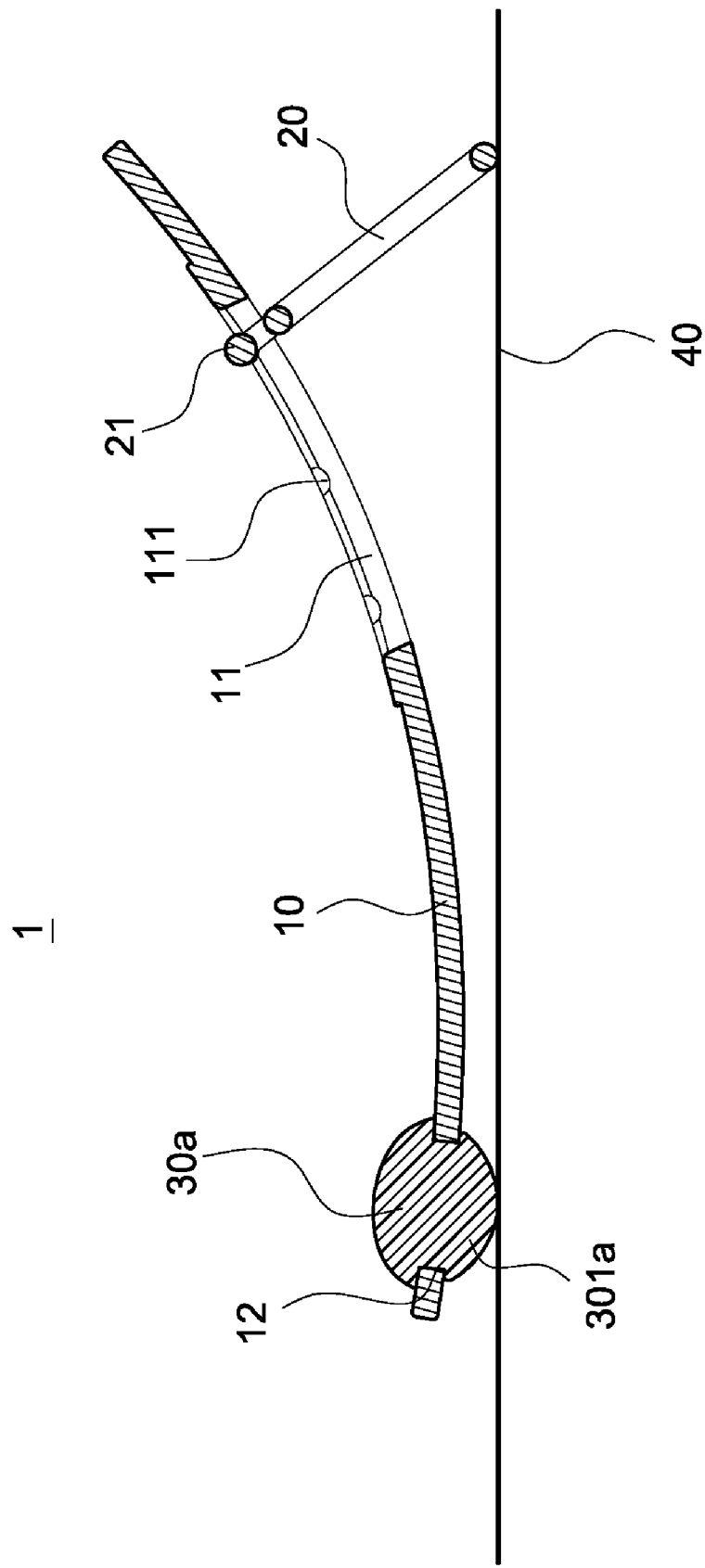
FIG. 7 is an assembled cross-sectional view showing the second embodiment of the present invention.

Please refer to FIGS. 6 and 7, which show the angle-adjustable heat-dissipating pad for a portable computer according to a second embodiment of the present invention. The second embodiment is substantially the same as the first embodiment. The only difference between the second embodiment and the first embodiment lies in that the supporting pad 30*a* in the second embodiment is made of cushioning materials. Furthermore, the supporting pad 30*a* is formed with a rib 301*a*. The rib 301*a* is disposed in at least one fixing trough 12*a* on the bottom of the plate 10, thereby connecting the supporting pad 30*a* to the bottom of the plate 10.

Figure 8:
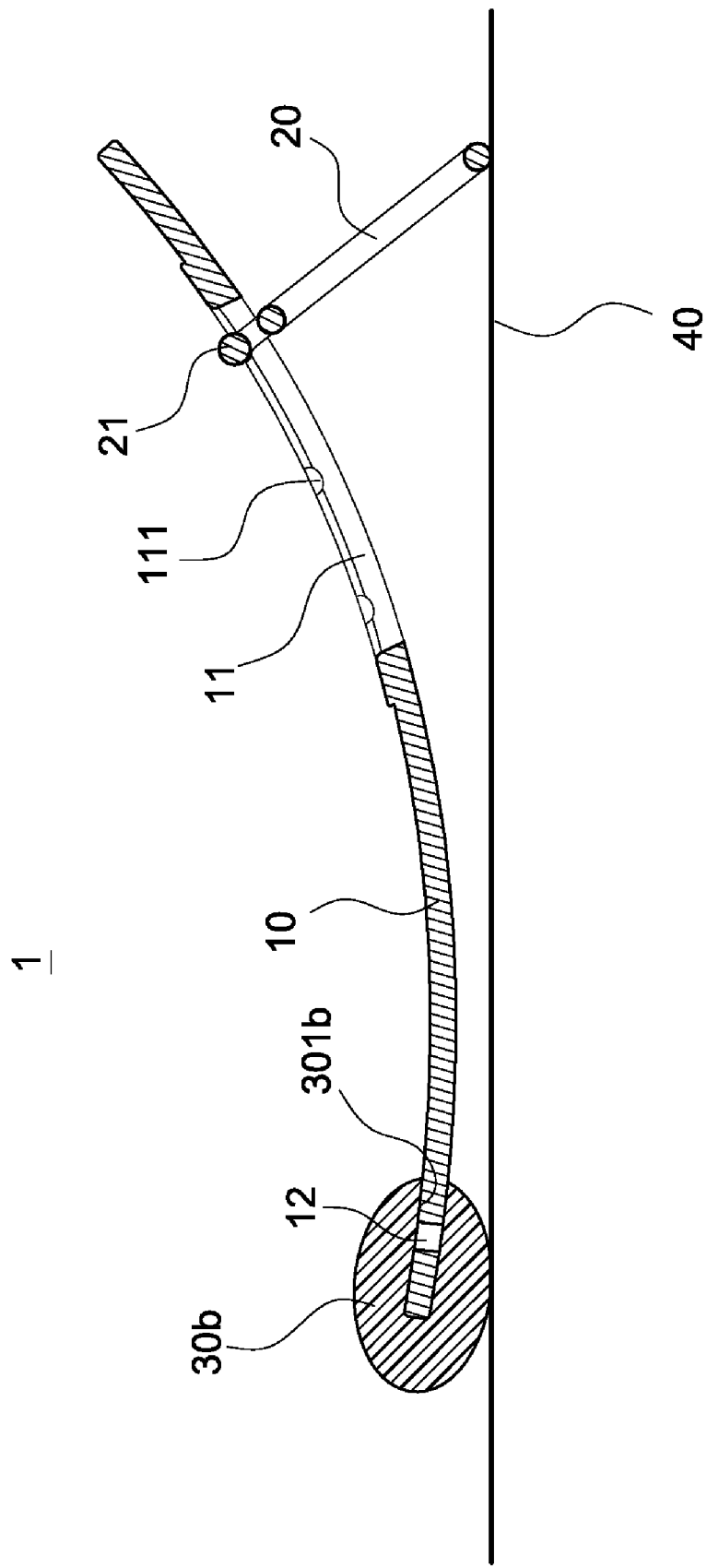
FIG. 8 is an assembled cross-sectional view showing the third embodiment of the present invention.

Please refer to FIG. 8, which shows the angle-adjustable heat-dissipating pad for a portable computer according to a third embodiment of the present invention. The third embodiment is substantially the same as the first and second embodiments. The only difference between the third embodiment and the first and second embodiments lies in that the supporting pad 30*b* in the third embodiment is made of elastic materials. Furthermore, the supporting pad 30*b* is formed with a slot 301*b*. The slot 301*b* can be used to clamp and position the supporting pad 30*b* to the bottom of the plate 10.

Therefore, in the angle-adjustable heat-dissipating pad 1 for a portable computer according to the present invention, the positioning post 21 of the support 20 can be positioned in the positioning groove 111 of the plate 10 in a multi-stage manner. Via this simple structure, the inclination angle of the plate 10 can be adjusted. Furthermore, the soft or elastic supporting pad 30, 30*a*, 30*b* can abut the portable computer 60 on the plate 10, thereby preventing the portable computer 60 from sliding on the plate 10. Furthermore, since the supporting pad 30 conforms to the ergonomics, the user may feel comfortable and his elbow can be protected when put on the supporting pad.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An angle-adjustable heat-dissipating pad for a portable computer, comprising:
    a plate provided with a guiding slot penetrating the plate, the plate on each of both sides of the guiding slot being provided with at least one positioning groove;
    a support provided with a positioning post, the positioning post passing through the guiding slot of the plate and being positioned in and engaged with the positioning grooves of the plate, the support being detachably assembled in the guiding slot of the plate to support the plate; and
    a frame provided in the periphery of the guiding slot, wherein the positioning grooves are provided on the frame.

2. The angle-adjustable heat-dissipating pad for a portable computer according to claim 1, wherein a cross section of the plate is formed into an arc shape.

3. The angle-adjustable heat-dissipating pad for a portable computer according to claim 1, wherein the plate is made of wood.

4. The angle-adjustable heat-dissipating pad for a portable computer according to claim 1, wherein the positioning groove is a concave surface, the plate is provided with a plurality of the positioning grooves, and the positioning grooves are symmetrically on the plate on both sides of the guiding slot at intervals.

5. The angle-adjustable heat-dissipating pad for a portable computer according to claim 1, wherein the support is a metallic frame.

6. An angle-adjustable heat-dissipating pad for a portable computer, comprising:
    a plate provided with a guiding slot penetrating the plate, the plate on each of both sides of the guiding slot being provided with at least one positioning groove, the bottom of the plate being provided with at least one fixing trough;
    a support provided with a positioning post, the positioning post passing through the guiding slot of the plate and being positioned in and engaged with the positioning grooves of the plate, the support being detachably assembled in the guiding slot of the plate to support the plate;
- a supporting pad passing through the fixing trough to be connected to the bottom of the plate; and
- a frame provided in the periphery of the guiding slot, wherein the positioning grooves are provided on the frame.

7. The angle-adjustable heat-dissipating pad for a portable computer according to claim 6, wherein the cross section of the plate is formed into an arc shape.

8. The angle-adjustable heat-dissipating pad for a portable computer according to claim 6, wherein the plate is made of wood.

9. The angle-adjustable heat-dissipating pad for a portable computer according to claim 6, wherein the positioning groove is a concave surface, the plate is provided with a plurality of the positioning grooves, and the positioning grooves are symmetrically on the plate on both sides of the guiding slot at intervals.

10. The angle-adjustable heat-dissipating pad for a portable computer according to claim 6, wherein the support is a metallic frame.

11. The angle-adjustable heat-dissipating pad for a portable computer according to claim 6, wherein the supporting pad is made of a soft cloth, the soft cloth is wound around the fixing trough to be connected with the bottom of the plate.

12. The angle-adjustable heat-dissipating pad for a portable computer according to claim 6, wherein the supporting pad is made of cushioning materials, the supporting pad is formed with a rib to be engaged with the fixing trough of the bottom of the plate, thereby connecting the supporting pad to the bottom of the plate.

13. The angle-adjustable heat-dissipating pad for a portable computer according to claim 1, further comprising a supporting pad made of elastic materials, wherein the supporting pad is formed with a slot to clamp on the bottom of the plate, thereby connecting the supporting pad to the bottom of the plate.

\* \* \* \* \*